(12) United States Patent
Zhu

(10) Patent No.: US 8,379,767 B2
(45) Date of Patent: Feb. 19, 2013

(54) METHODS AND SYSTEMS TO COMPENSATE IQ IMBALANCE IN ZERO-IF TUNERS

(75) Inventor: Jie Zhu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 12/565,365

(22) Filed: Sep. 23, 2009

(65) Prior Publication Data
US 2011/0069767 A1 Mar. 24, 2011

(51) Int. Cl.
H03D 3/00 (2006.01)
(52) U.S. Cl. ........................................ 375/322
(58) Field of Classification Search .................. 375/322, 375/259, 224, 219, 260, 295, 316; 455/296, 455/313, 323
See application file for complete search history.

(56) References Cited

U.S. PATENT DOCUMENTS

| 5,705,949 | A | 1/1998 | Alelyunas et al. | |
|---|---|---|---|---|
| 6,330,290 | B1 | 12/2001 | Glas | |
| 6,466,497 | B1 | 10/2002 | Desai et al. | |
| 6,670,900 | B1 | 12/2003 | Zhang | |
| 7,173,988 | B2 | 2/2007 | Cochran et al. | |
| 7,184,714 | B1 | 2/2007 | Kutagulla et al. | |
| 7,187,606 | B1 | 3/2007 | Goel | |
| 7,668,035 | B2 | 2/2010 | Chu et al. | |
| 7,830,727 | B2 | 11/2010 | Arsovski et al. | |
| 8,135,055 | B2 * | 3/2012 | Kohlmann | ..................... 375/224 |
| 2004/0063416 | A1 * | 4/2004 | Kuenen et al. | ................. 455/313 |
| 2009/0233562 | A1 | 9/2009 | Kim et al. | |
| 2010/0165753 | A1 | 7/2010 | Wijeratne et al. | |
| 2011/0069744 | A1 | 3/2011 | Laudel et al. | |
| 2011/0069767 | A1 | 3/2011 | Zhu | |
| 2011/0199850 | A1 | 8/2011 | Yang | |
| 2011/0273945 | A1 | 11/2011 | Donkoh | |

* cited by examiner

Primary Examiner — Khai Tran
(74) Attorney, Agent, or Firm — Garrett IP, LLC

(57) ABSTRACT

Methods and systems to calibrate I/Q imbalance with digital equalizers to compensate frequency dependent IQ imbalance, weighted summation modules to compensate frequency independent IQ imbalance, switch modules to controllably direct calibration signals through selected components and to a digital compensation calculator and to control tuner phases during calibration. The equalizers and summation modules may provide genetic IQ imbalance compensation. Methods and systems disclosed herein may be implemented with respect to relatively wideband systems having non-linear spectrum responses, and other systems.

19 Claims, 8 Drawing Sheets

METHODS AND SYSTEMS TO COMPENSATE IQ IMBALANCE IN ZERO-IF TUNERS

BACKGROUND

A zero intermediate frequency (ZIF) tuner, also referred to herein as a direct frequency converter and single stage frequency converter, converts between relatively high frequency signal and baseband directly rather than through one or more intermediate stages or intermediate frequencies.

ZIF tuners may introduce imbalance between in-phase and quadrature phase (IQ) paths. IQ imbalance may arise from current leakage, characteristics, and differences between circuit components in I and Q paths. IQ imbalance may include frequency dependent IQ imbalance arising from low pass filters of a ZIF tuner, and frequency independent IQ imbalance arising from mixers of the ZIF tuner.

IQ imbalance may be reduced with stricter tolerances of ZIF tuner components and/or with compensation applied in an analog domain, but at a relatively substantial cost.

Where ZIF low pass filters have a relatively flat spectrum response and a linear phase over a passband, IQ imbalance may be compensated with gain and phase correction in a digital domain. A narrow bandwidth system may have a relatively flat low pass filter spectrum response and a relatively linear phase over a bandwidth. Thus, calibration and compensation may be performed in a digital domain. In wideband systems, however, such as a Multimedia over Coax Alliance (MoCA) standard based system, a ZIF tuner may have relatively high order low-pass filters to provide a wide passband and sharp cut-off. In such a wideband system, a flat passband may be prohibitively expensive and digital gain and phase compensation techniques may not be sufficient to correct IQ imbalance.

BRIEF DESCRIPTION OF THE DRAWINGS/FIGURES

Figure 1:
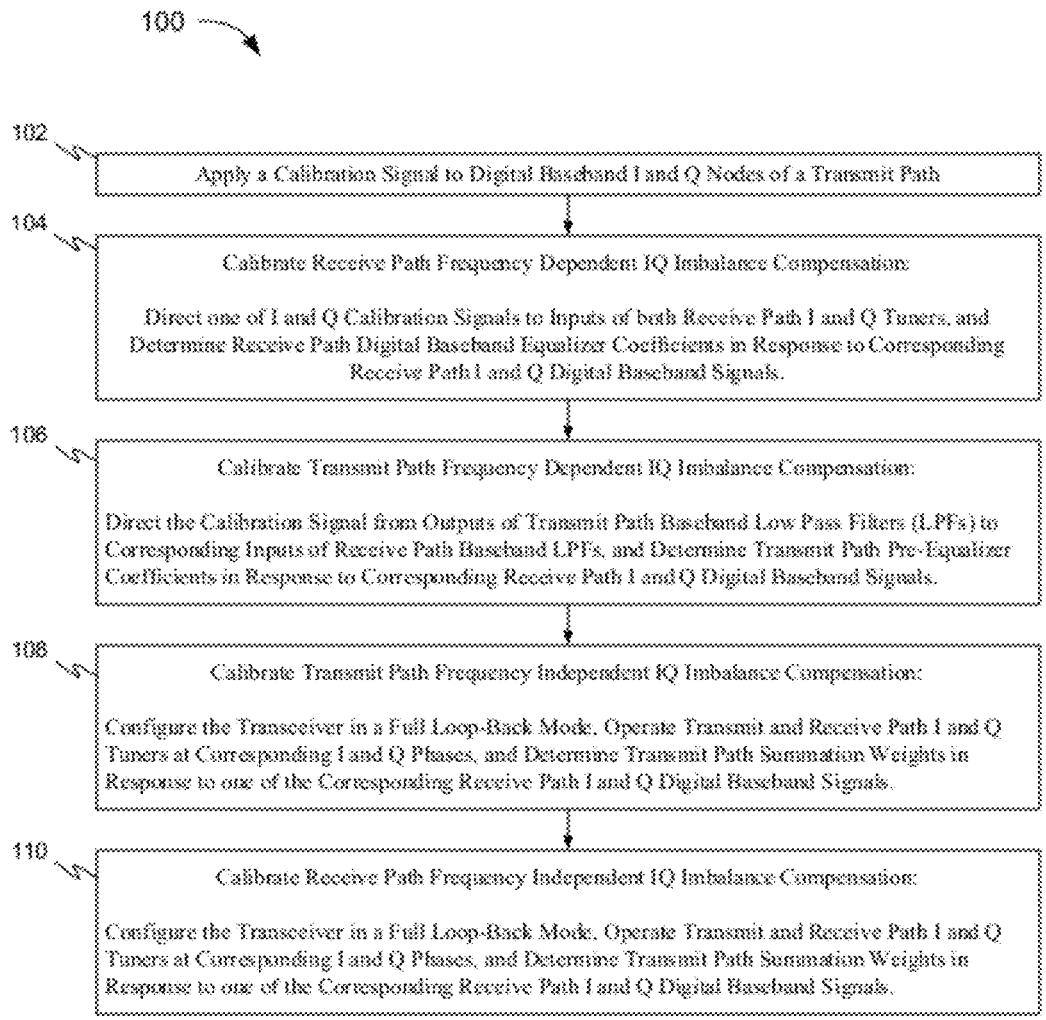
FIG. 1 is a process flowchart of an exemplary method of calibrating frequency dependent and frequency independent IQ imbalance in transmit and receive paths of a transceiver.

In the drawings, the leftmost digit(s) of a reference number identifies the drawing in which the reference number first appears.

DETAILED DESCRIPTION

Disclosed herein are methods and systems to calibrate I/Q imbalance in transceivers, including zero intermediate frequency (ZIF) based transceivers, and including calibration of frequency independent I/Q imbalance generated within frequency converters and frequency dependent I/Q imbalance generated within baseband low pass filters.

Methods and systems disclosed herein may be implemented with respect to relatively wideband systems, narrowband systems, systems having linear spectrum responses, systems having non-linear spectrum responses, and combinations thereof.

Methods and systems disclosed herein include digital equalizers to compensate frequency dependent IQ imbalance, weighted summation modules to compensate frequency independent IQ imbalance, and switch modules to controllably direct calibration signals through selected components and to a digital compensation calculator, and to control tuner phases during calibration.

FIG. 1 is a process flowchart of an exemplary method 100 of calibrating frequency dependent and frequency independent IQ imbalance in transmit and receive paths of a transceiver. Method 100 is described below with reference to FIGS. 2-11. Method 100 is not, however, limited to the examples of FIGS. 2-11. Method 100, or portions thereof, may be implemented under control of a state machine.

Figure 2:
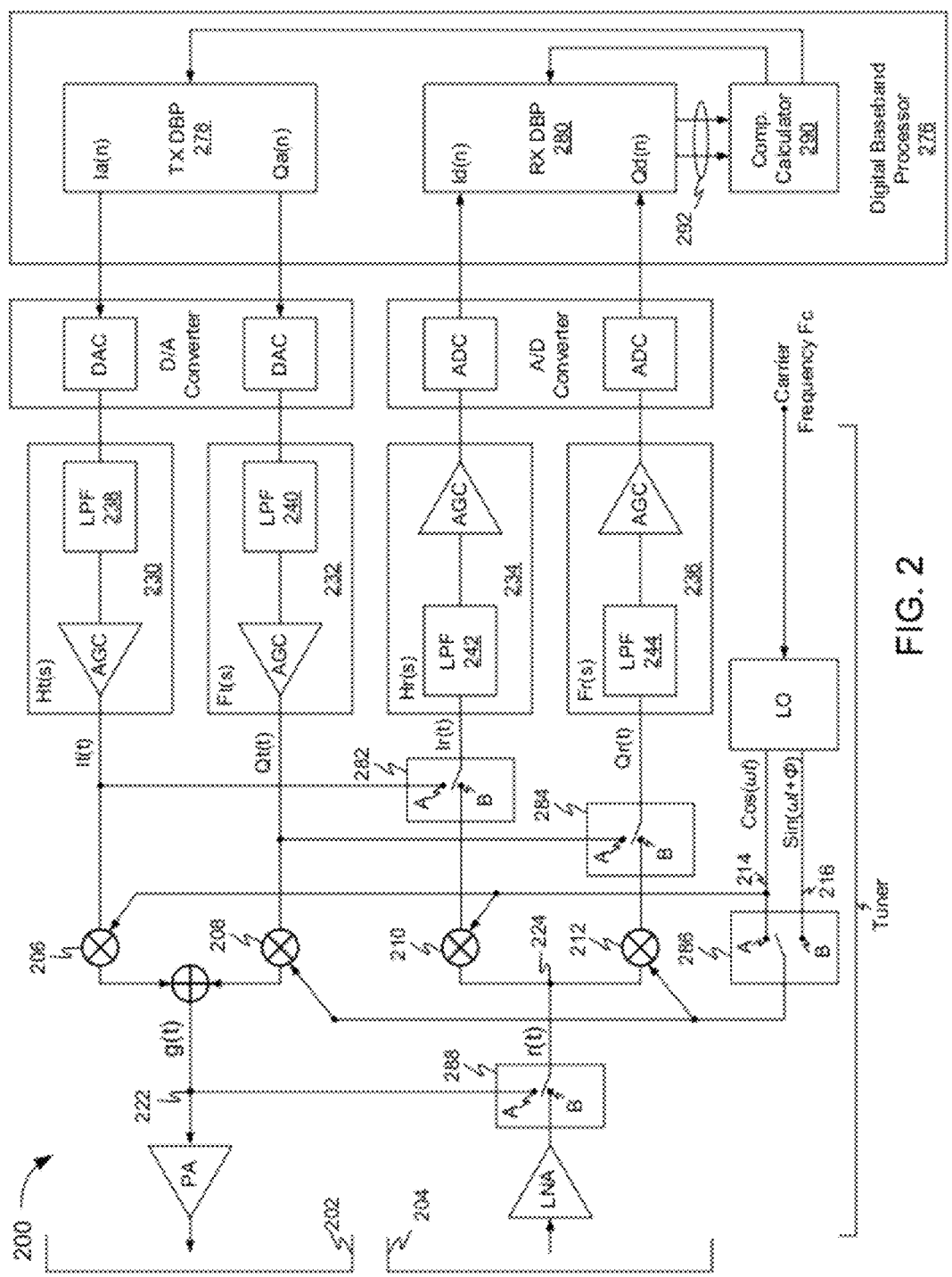
FIG. 2 is a block diagram of an exemplary transceiver, including a transmit path, a receive path, and a digital baseband processor.

FIG. 2 is a block diagram of an exemplary transceiver 200, including a transmit path 202 and a receive path 204. Transmit path 202 may include I and Q frequency up-converters 206 and 208, and receive path 204 may include I and Q frequency down-converters 210 and 212. Frequency converters 206 through 212 may include zero-intermediate frequency (ZIF) converters, also referred to herein as direct frequency converters and single-stage frequency converters, to convert between a carrier frequency and a relatively low intermediate frequency or baseband.

Frequency up-converters 206 and 208 may be configured to mix I and Q reference or carrier signals 214 and 216 with corresponding baseband signals It(t) and Qt(t), to generate an image of the baseband signals at the carrier frequency, illustrated here as g(t) at a summation node 222.

Frequency down-converters 210 and 212 may be configured to mix I and Q reference signals 214 and 216 with a received signal r(t) at a node 224, to generate corresponding I and Q baseband signals Ir(t) and Qr(t). Baseband signals Ir(t) and Qr(t) may correspond to relatively low frequency I and Q images of signal r(t), or may correspond to I and Q baseband components of signal r(t).

Transceiver 200 may include I and Q transmit path analog baseband processing components 230 and 232, and I and Q receive path analog baseband processing components 234 and 236. In the example of FIG. 2, components 230 through 236 include corresponding low pass filters (LPFs) 238 through 244.

Transceiver 200 may include a digital baseband processor (DBP) 276, including a transmit portion 278 and a receive portion 280.

Transceiver 200 may be configured as a relatively wideband system, and may be implemented in accordance with a Multimedia over Coax Alliance (MoCA) standard as promulgated and/or proposed by the MoCA at http://www.mocalliance.org/, such as to facilitate home networking on coaxial cable, which may operate in a bandwidth of 50 MHz or higher, and which may include OFDM modulation. Transceiver 200 is not, however, limited to wideband systems.

Transceiver 200 may be subject to one or more of frequency dependent and frequency independent IQ imbalance. For example, receive path baseband analog components 234 and 236 may have respective transfer characteristics Hr(s) and Fr(s), which may include filter characteristics associated with I and Q LPFs 242 and 244. Where characteristics Hr(s) and Fr(s) differ from one another, frequency dependent IQ imbalance may be imparted to corresponding signals Ir(t) and Qr(t).

Similarly, transmit path baseband analog components 230 and 232 may have respective transfer characteristics Ht(s) and Ft(s), which may include filter characteristics associated with I and Q LPFs 238 and 240. Where characteristics Ht(s) and Ft(s) differ from one another, frequency dependent IQ imbalance may be imparted to corresponding signals It(t) and Qt(t).

As disclosed herein, frequency dependent IQ imbalance may be compensated with a digital equalizer in one of the I and Q baseband receive paths, and a corresponding delay element in the other receive path, and with a digital pre-equalizer in one of the I and Q baseband transmit paths and a corresponding delay element in the other transmit path.

Frequency independent IQ imbalance may arise in transmit path mixers 206 and 208, and in receive path mixers 210 and 212. As disclosed herein, frequency independent IQ imbalance may be compensated in a digital domain with a weighted summation module in each of the transmit and receive paths.

DBP 276 may include compensation calculator 290 to determine IQ compensation values from receive path digital baseband data 292.

Figure 3:
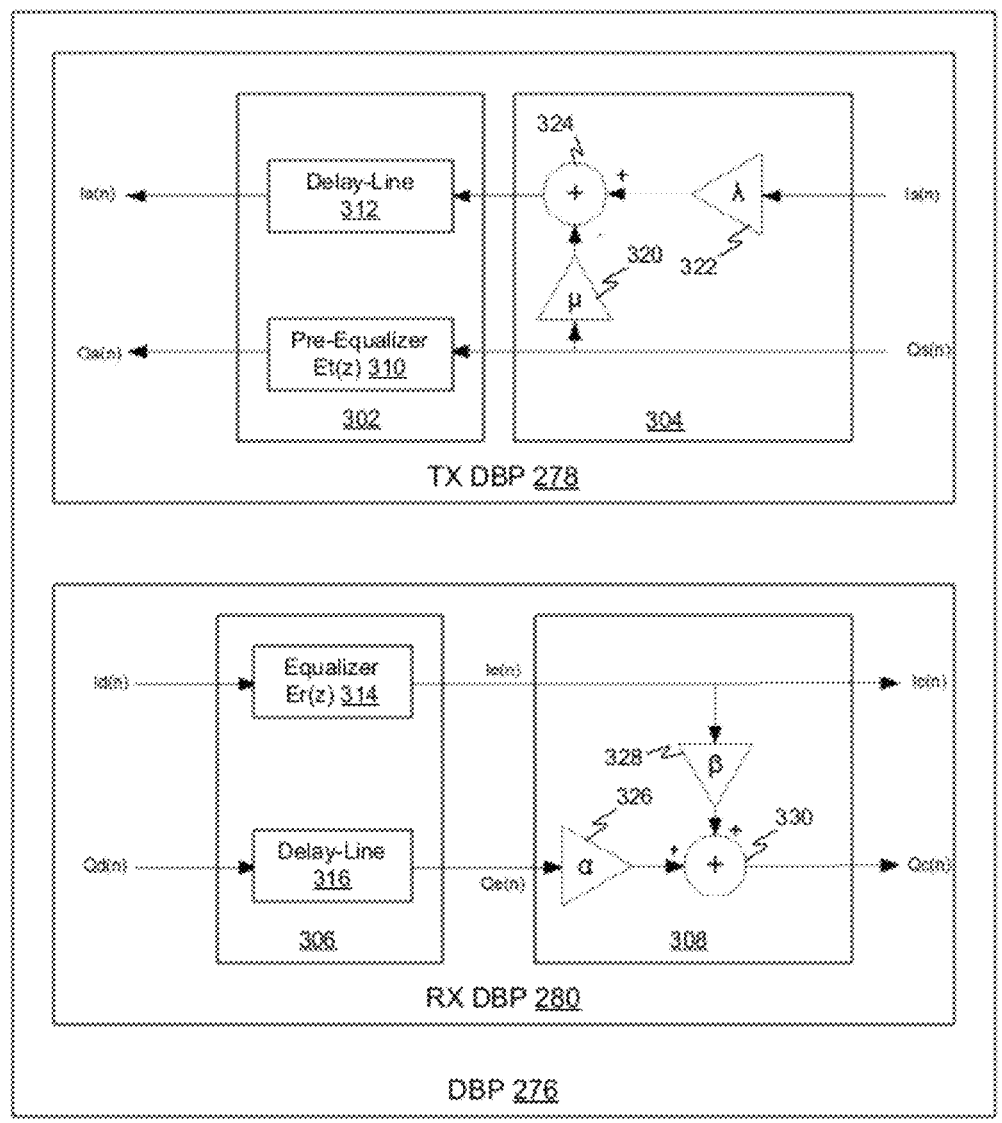
FIG. 3 is a block diagram of the digital baseband processor of FIG. 2, including transmit and receive portions, each including a frequency dependent compensation module and a frequency independent compensation module.

FIG. 3 is a block diagram of DBP 276, wherein transmit path DBP 278 includes a frequency dependent compensation module 302 and a frequency independent compensation module 304, and receive path DBP 280 includes a frequency dependent compensation module 306 and a frequency independent compensation module 308.

In the example of FIG. 3, transmit path frequency dependent compensation module 302 includes a pre-equalizer 310 and a delay line 312 to compensate imbalance between transfer functions Ht(s) and Ft(s) of transmit path 202 of FIG. 2.

Receive path frequency dependent compensation module 306 includes an equalizer 314 and a delay line 316 to compensate imbalance between transfer functions Hr(s) and Fr(s) of receive path 204 of FIG. 2.

Transmit path frequency independent compensation module 304 includes a weighted summation module, including weighted modules 320 and 322 and a summation node 324. Weighted modules 320 and 322 are weighted with corresponding parameters μ and λ.

Receive path frequency independent compensation module 308 includes a weighted summation module, including weighted modules 326 and 328 and a summation node 330. Weighted modules 326 and 328 are weighed with corresponding parameters α and β.

Calibration of transceiver 200 may include calibrating one or more of coefficients of pre-equalizer 310, coefficients of equalizer 314, and weights λ, μ, α, and β.

Transceiver 200 may include switches and control circuitry to selectively control signal flow within transceiver 200 and to control tuner phases during a calibration mode. In the example of FIG. 2, transceiver 200 includes switches 282, 284, 286, and 288, each having corresponding positions A and B.

Referring to method 100 in FIG. 1, at 102, a calibration signal is applied to digital baseband I and Q nodes of a transceiver transmit path. The calibration signal may include a phase of an internally generated modulated carrier signal. In FIG. 2, the calibration signal may be output from transmit DBP 278 as Ia(n) and Qa(n).

At 104, receive path frequency dependent IQ imbalance is calibrated. Calibration at 104 may include configuring the transceiver in a full loop back mode and directing one of I and Q calibration signals from the transmit path to inputs of both of I and Q receive path LPFs. Calibration at 104 may further include determining receive path digital baseband equalizer coefficients in response to corresponding receive path I and Q digital baseband signals, and may include adjusting the receive path equalizer coefficients may to balance the receive path I and Q digital baseband signals.

In FIG. 2, switches 282 and 284 may be placed in position B to couple outputs of I and Q receive path mixers 210 and 212 to corresponding I and Q receive path LPFs 242 and 244. Switch 286 may be placed in position A to provide a common reference signal, illustrated here as I phase reference signal $\cos(\omega t)$, to mixers 206, 208, 210, and 212. This effectively provides only an in-phase calibration signal to both of I and Q receive path LPFs 242 and 244, which may avoid introducing frequency independent, mixer-based IQ imbalance during calibration of frequency dependent receive path IQ imbalance. Switch 288 may be placed in position A to configure transceiver 200 in a full-loop back mode. Switch 288 may remain in position A throughout a calibration mode to isolate receive path 204 from external interference.

Figure 4:
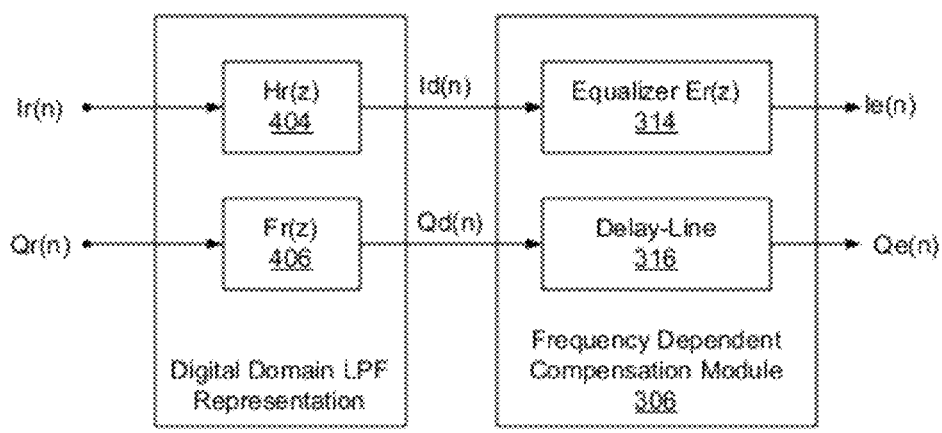
FIG. 4 is an exemplary signal flow diagram corresponding to a receive path frequency dependent IQ imbalance calibration.

FIG. 4 is a corresponding signal flow diagram during receive path frequency dependent IQ imbalance calibration. In the example of FIG. 4, transfer functions Hr(z) 404 and Fr(z) 408 represent transfer functions Hr(s) and Fr(s) of receive path LPFs 242 and 244 in FIG. 2 in a digital domain. Equalizer 314 may be calibrated to compensate IQ imbalance arising from differences between transfer functions Hr(z) 404 and Fr(z) 406.

Frequency-dependent I/Q imbalance caused by $H_r(z)$ 404 and Fr(z) 406 is compensated when the convolution of I-channel low-pass filter transfer function Hr(z) 404 and equalizer Er(z) 314 is equal to a convolution of Q channel low-pass filter transfer function Fr(z) 406 and delay line 316, such that:

$$H_r(z) \otimes E_r(z) = F_r(n) * z^N,$$

where N is a delay of delay line 316.

The delay N of delay line 316 may be approximately equal to one half a length of equalizer 314. The length of equalizer may be determined by channel transfer functions Hr(z) 404 and Fr(z) 406.

Since both Ir(n) and Qr(n) are mixed with the same signal 214 at corresponding mixers 210 and 212, equalizer 314 and delay line 316 are such that Ie(n) equals Qe(n), IQ imbalance is compensated. Mathematically:

$$I_e(z) = E_r(z)I_d(z) = E_r(z)H_r(z)I_r(z); \text{ and}$$

$$Q_e(z) = Q_d(z^{-N}) = z^{-N}F_r(z)Q_r(z), \text{ which lead to;}$$

$$E_r(z)H_r(z) = z^{-N}F_r(z).$$

Figure 5:
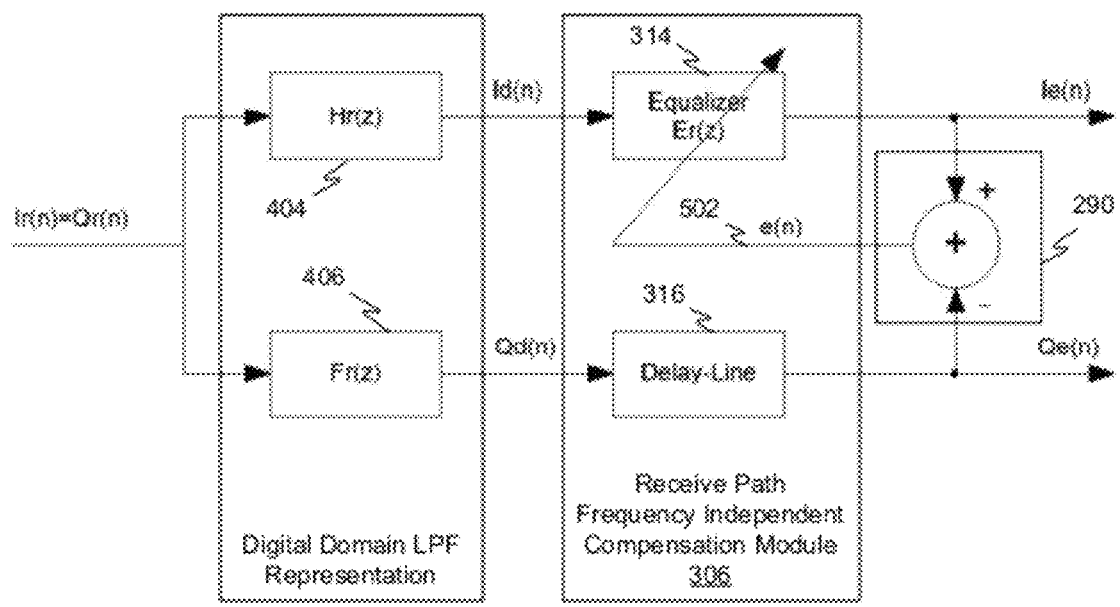
FIG. 5 is a block diagram of an exemplary configuration to calibrate receive path frequency dependent IQ imbalance.

FIG. 5 is a block diagram of an exemplary configuration to calibrate receive path frequency dependent IQ imbalance.

Receive path digital baseband signal Id(n) and Qd(n) are received at compensation module 300, and signals Ie(n) and Qe(n) are output from compensation module 300 to compensation calculator 290. Compensation calculator 290 may determine a difference between signals Ie(n) and Qe(n) and generate a difference signal or value e(n) 502. Compensation calculator 290 or equalizer 314 may adjust one or more coefficients of equalizer 314 in response to difference signal e(n) 502.

Equalizer 314 may be implemented with one or more of a variety of architectures and coefficients of equalizer 314 may be computed in accordance with one or more of a variety of techniques. For example, and without limitation, equalizer 314 may include one or more of a finite impulse response (FIR) filter and an infinite impulse response (IIR) filter, and coefficients of equalizer 314 may be computed adaptively and/or directly.

The example of FIG. 5 may correspond to an adaptive FIR filter, and coefficients of equalizer 314 may be updated continuously in response to difference signal e(n) 502. Updating of the coefficients may be halted when an energy of difference signal e(n) 502 is below a threshold. Coefficients may be loaded or applied to equalizer 314 prior to further calibration of system 200.

Referring to method 100 in FIG. 1, at 106, transmit path frequency dependent IQ imbalance is calibrated. Calibration at 106 may be performed subsequent to calibration of receive path frequency dependent IQ imbalance at 104. Calibration at 106 may include directing the calibration signal from outputs of transmit path low pass baseband filters to corresponding inputs of receive path low pass baseband filters, and determining transmit path equalizer coefficients in response to corresponding receive path I and Q digital baseband signals.

In FIG. 2, switches 282 and 284 may be placed in position A to direct outputs It(t) and Qt(t) of transmit path analog baseband components 230 and 232, to inputs Ir(t) and Qr(t) of receive path analog baseband components 234 and 236.

Figure 6:
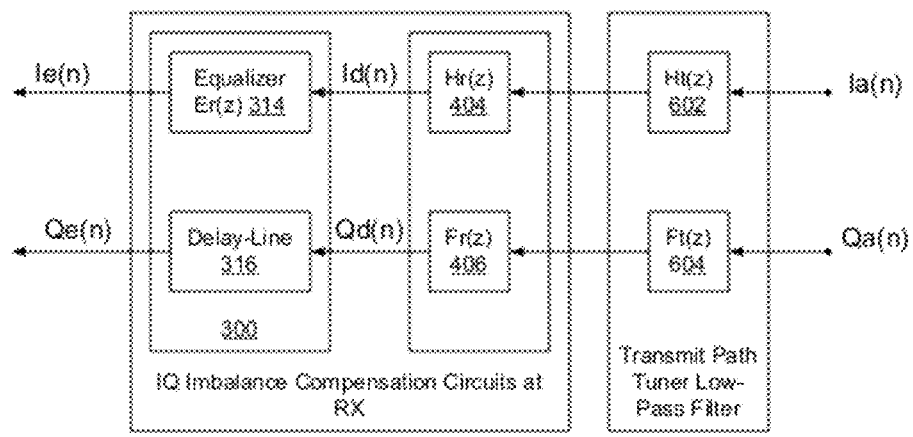
FIG. 6 is an exemplary signal flow diagram corresponding to transmit path frequency dependent IQ imbalance calibration.

FIG. 6 is a corresponding signal flow diagram during transmit path frequency dependent IQ imbalance calibration.

In the example of FIG. 6, digital domain transfer functions Ht(z) 602 and Ft(z) 604 represent transfer functions Ht(s) and Ft(s) of transmit path 202 in FIG. 2. Pre-equalizer 310 may be calibrated to compensate IQ imbalance arising from differences between transfer functions Ht(z) 602 and Ft(z) 604.

Figure 7:
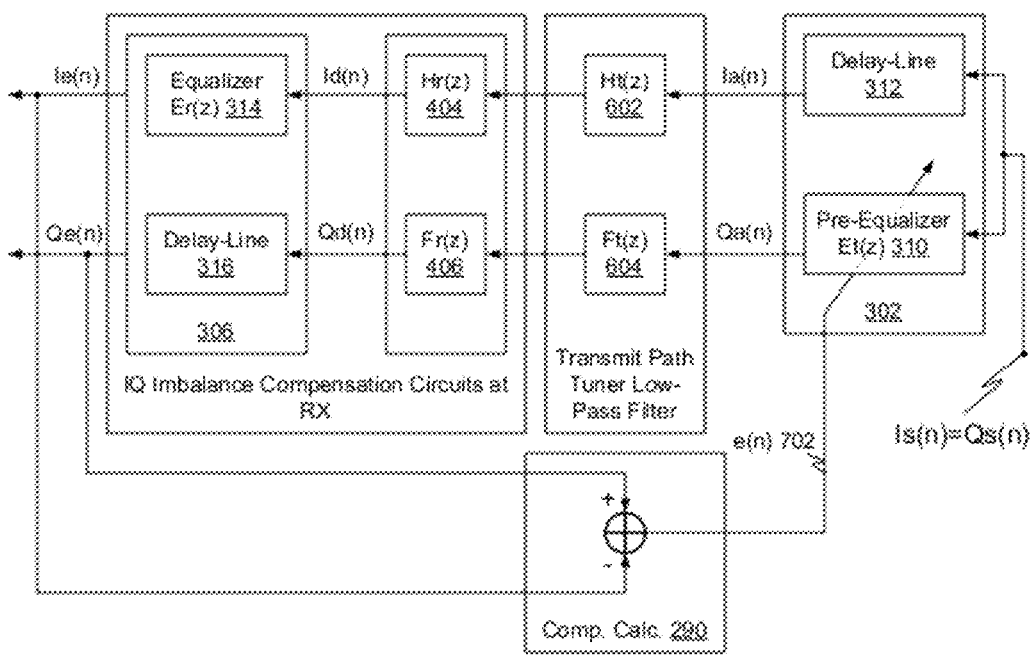
FIG. 7 is a block diagram of an exemplary configuration to calibrate transmit path frequency dependent IQ imbalance.

FIG. 7 is a block diagram of an exemplary configuration to calibrate transmit path frequency dependent IQ imbalance.

Baseband transmit signals Is(n) and Qs(n) may be set equal to one another, and may be directed through respective ones of transmit path delay line 312 and pre-equalizer 310, through transmit path LPFs 230 and 230, represented in FIG. 7 as Ht(z) 602 and Ft(z) 604, through receive path LPFs 242 and 244, represented in FIG. 7 as Hr(z) 404 and Fr(z) 406, and through equalizer 314 and delay line 316. Corresponding receive path baseband signals Ie(n) and Qe(n) may be provided to compensation calculator 290.

Where receive path equalizer 314 is previously calibrated with respect to LPFs 242 and 244, any frequency dependent IQ imbalance between baseband signals Ie(n) and Qe(n) may be attributed to transmit path LPFs 230 and 230.

Compensation calculator 290 may determine a difference between signals Ie(n) and Qe(n) generate a difference signal or value e(n) 702. Coefficients of pre-equalizer 310 may be adjusted to decrease the energy of difference signal e(n) 702 such that baseband signals Ie(n) and Qe(n) are substantially equal to one another, such as described above with respect to FIG. 5.

Pre-equalizer 310 may be implemented with one or more of a variety of architectures and coefficients of pre-equalizer 310 may be computed in accordance with one or more of a variety of techniques. For example, and without limitation, pre-equalizer 310 may include one or more of a finite impulse response (FIR) filter and an infinite impulse response (IIR) filter, and coefficients of pre-equalizer 310 may be computed adaptively and/or directly.

The example of FIG. 7 may correspond to an iterative update technique to determine coefficients of pre-equalizer 310. Coefficients of the pre-equalizer 310 may be iteratively updated by a preset or pre-determined increment in response to difference signal e(n) 702. An equalization state may correspond to:

$$E_t(z)F_t(z) = z^{-M}H_t(z),$$

where M is a delay of delay line 312.

The length of delay line 312 may be substantially equal to a delay of pre-equalizer 310.

Referring to method 100 in FIG. 1, at 108, transmit path frequency independent IQ imbalance is calibrated. Calibration at 108 may be performed subsequent to receive path and transmit path frequency dependent IQ imbalance calibration at 104 and 106, respectively.

Calibration at 108 may include configuring the transceiver in a full loop-back mode, operating the transmit and receive path I and Q tuners at corresponding I and Q phases, and determining transmit path summation weights in response to one of the corresponding receive path I and Q digital baseband signals.

Figure 8:
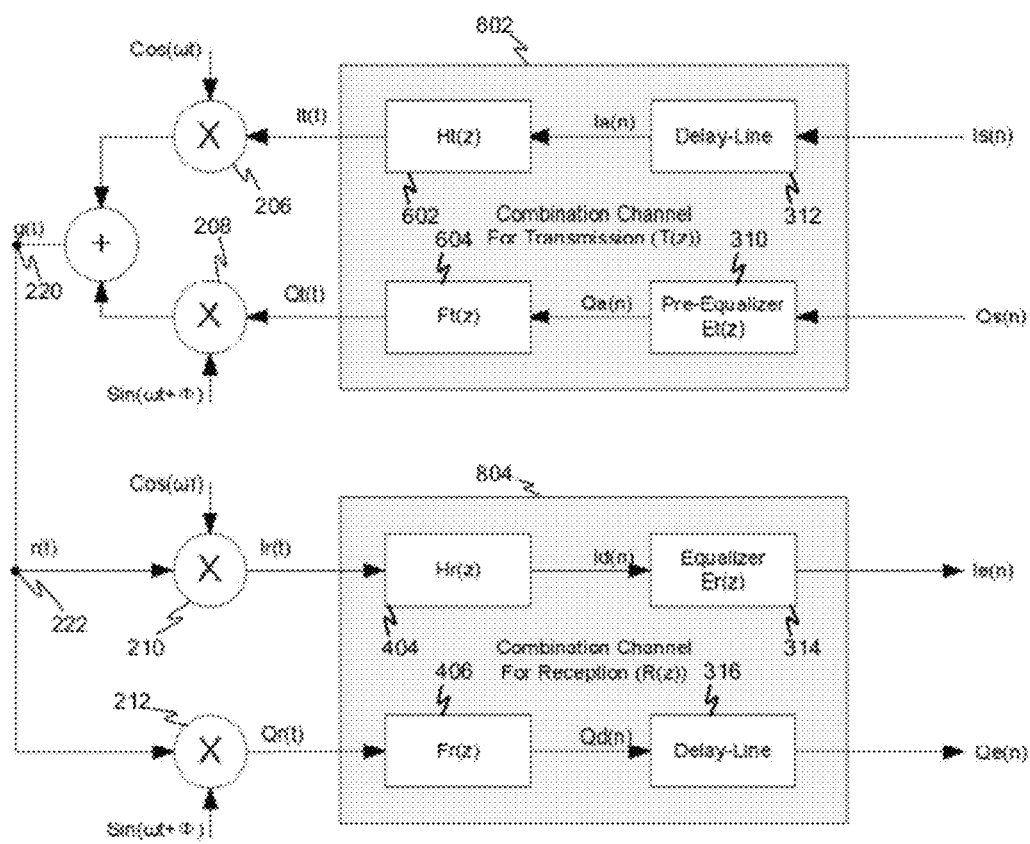
FIG. 8 is an exemplary signal flow diagram to calibrate transmit path frequency independent IQ imbalance

In FIG. 2, switches 282, 284, and 286 may be placed in position B, and switch 288 may remain in position A. FIG. 8 is a corresponding signal flow diagram to calibrate transmit path frequency independent IQ imbalance. Transfer functions T(z) 802 and R(z) 804 represent effects of transmit path and receive paths, respectively.

In FIG. 2, transmit signal g(t) may be represented as:

$$g(t) = I_t(t)\cos(\omega t) + Q_t(t)\sin(\omega t + \phi),$$

where $\phi$ represents a phase difference to be compensated.

At receive node 224, g(t) is down-converted to in-phase and quadrature components, which may be represented as:

$$I_r(\tau) = I_t(\tau)\cos(\theta) + Q_t(\tau)\sin(\phi+\theta); \text{ and}$$

$$Q_r(\tau) = -I_t(\tau)\sin(\theta) + Q_t(\tau)\cos(\phi+\theta);$$

where $\theta = \omega(\tau-t)$.

There may not be a complex number a+jb such that:

$$I_r(\tau) + j^*Q_r(\tau) = (a+jb)(I_t(\tau) + j^*Q_t(\tau)),$$

due to $\phi \neq 0$.

This is referred to herein as frequency independent IQ imbalance in g(t).

To compensate frequency independent IQ imbalance in g(t), let:

$$I_t(\tau) = \lambda I_t^c(\tau) + \mu Q_t(\tau).$$

Applying $I_t(\tau)$ to equations above for $I_r(\tau)$ and $Q_r(\tau)$ provides:

$$I_r(\tau) = \lambda I_t^c(\tau)\cos(\theta) + \mu Q_t(\tau)\cos(\theta) + Q_t(\tau)\sin(\phi+\theta)$$

and $$Q_r(\tau) = -\lambda I_t^c(\tau)\sin(\theta) - \mu Q_t(\tau)\sin(\theta) + Q_t(\tau)\cos(\phi+\theta)$$

When $\lambda = \cos(\phi)$ and $\mu = -\sin(\phi)$, $I_r(\tau)$ and $Q_r(\tau)$ become:

$$I_r(\tau) = \lambda(I_t^c(\tau)\cos(\theta) + Q_t(\tau)\sin(\theta));$$

and $$Q_r(\tau) = -\lambda(I_t^c(\tau)\sin(\theta) + Q_t(\tau)\cos(\theta))$$

In other words:

$$I_r(\tau) + j^*Q_r(\tau) = \lambda(\cos(\theta) - j\sin(\theta))(I_t^c(\tau) + j^*Q_t(\tau)).$$

I and Q components of transmission signal g(t) are thus balanced in term of input:

$$I_t^c(\tau)+j*Q_t(\tau).$$

To determine $\lambda$ and $\mu$, $I_r(t)$ may be expressed as:

$$I_r(t)=r(t)\cos(\omega\tau)=(I_t(t)\cos(\omega t)+Q_t(t)\sin(\omega t+\phi))\cos(\omega\tau).$$

After passing through the low-pass filter Hr(t), where $\theta=\omega(\tau-t)$, $I_r(t)$ may be expressed as:

$$I_r(t)=I_t(t)\cos(\theta)+Q_t(t)\sin(\phi+\theta).$$

Since $I_r(t)$ is generated in analog circuits, $\tau\approx t$. $I_r(t)$ may thus be expressed as:

$$I_r(t)=I_t(t)+Q_t(t)\sin(\phi).$$

Where $I_t(t)=\lambda I_t^c(t)+\mu Q_t(\tau)$ as defined above. Let $\lambda=\cos(x)$, $\mu=-\sin(x)$. Applying $I_t(t)=\cos(x)I_t^c(t)-\sin(x)Q_t(t)$, provides:

$$I_r(t)=\cos(x)I_t^c(t)-\sin(x)Q_t(t)+Q_t(t)\sin(\phi).$$

A function $f(x)$ may be defined as $f(x)=|I_r(t)^2|$.

When $I_t^c(t)=0$ and $f(x)=0$, or $I_t^c(t)$ and $Q_t(t)$ are uncorrelated and the expectation of $f(x)$ is zero, $x=\phi$. Phase $\phi$ may be obtained in one or more of a variety of ways.

Figure 9:
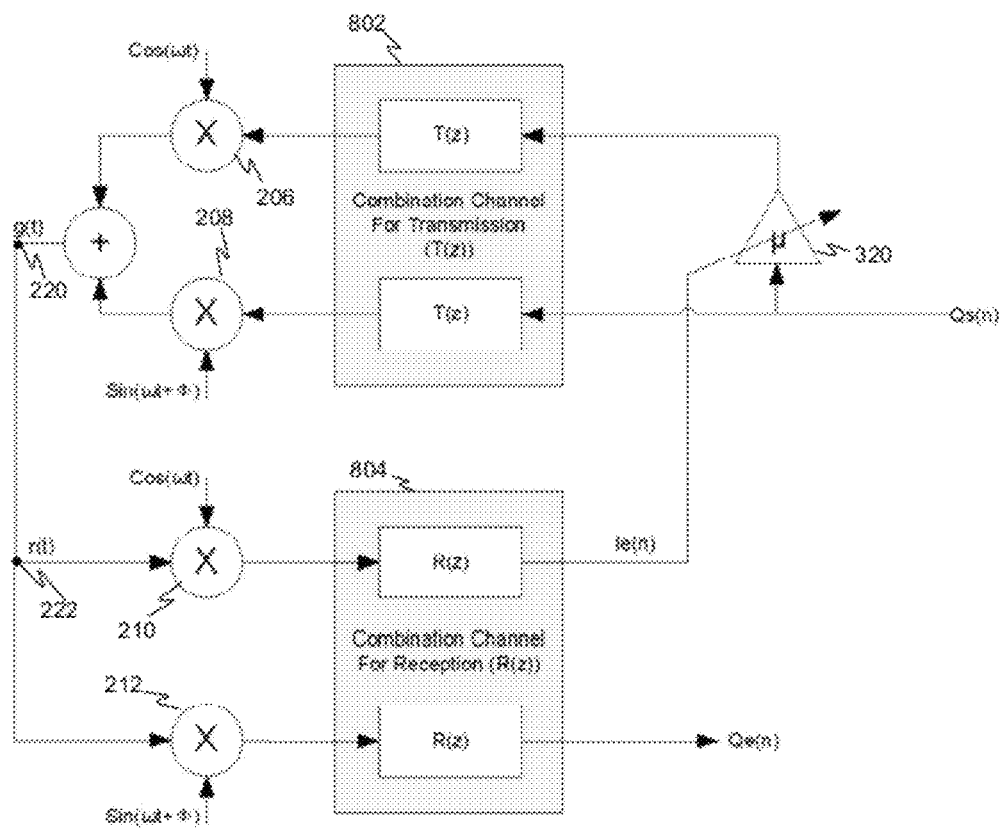
FIG. 9 is a block diagram of an exemplary configuration to calibrate transmit path frequency independent IQ imbalance.

For example, $I_t^c(t)$ may be set to zero and an energy of $f(x)$ may be minimized. Where transmit path LPFs 238 and 240 are substantially identical to one another and substantially linear, computation of phase $\phi$ may be performed in the digital baseband domain. The output signal from reception channel Ie(n) may be utilized as an error signal to update $\mu$, such as illustrated in FIG. 9. Where $\mu$ is implemented on a scale, updating may converge relatively quickly. An initial value of $\mu$ may be between $-\sin(\pi/30)$ and $\sin(\pi/30)$, such as where phase $\phi$ is less than 5 degrees.

Parameter $\lambda$, may be determined as. $\lambda=\sqrt{1-\mu^2}$

Figure 10:
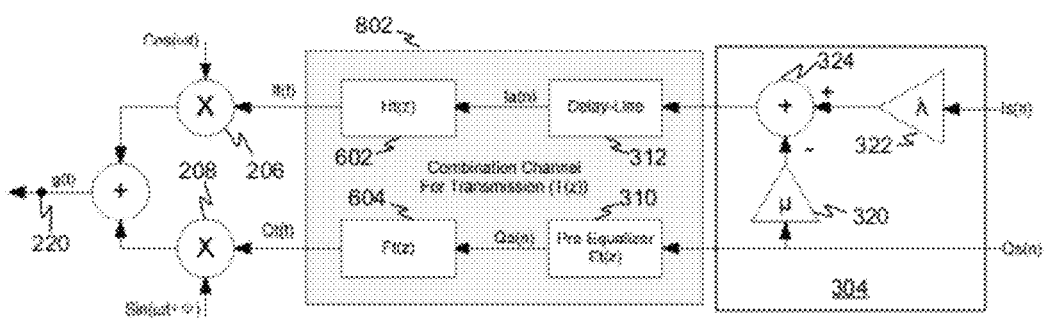
FIG. 10 is a block diagram of an exemplary configuration to calibrate transmit path frequency independent IQ imbalance.

FIG. 10 is another block diagram of an exemplary configuration to calibrate transmit path frequency independent IQ imbalance. Transmission signal g(t) may be represented as:

$$g(t)=I_s(t)\cos(\omega t)+Q_s(t)\sin(\omega t).$$

Referring to method 100 in FIG. 1, at 110, receive path frequency independent I/Q imbalance is calibrated. Calibration at 110 may be performed subsequent to receive path and transmit path frequency dependent IQ imbalance calibration at 104 and 106, respectively, and subsequent to transmit path frequency independent IQ imbalance calibration at 108.

Calibration at 110 may include configuring the transceiver in a full loop-back mode, operating the transmit and receive path I and Q tuners at corresponding I and Q phases, and determining transmit path summation weights in response to one or more of the corresponding receive path I and Q digital baseband signals, such as described above with respect to 108.

In FIG. 2, switches 282, 284, and 286 may be placed in position B, and switch 288 may remain in position A.

Figure 11:
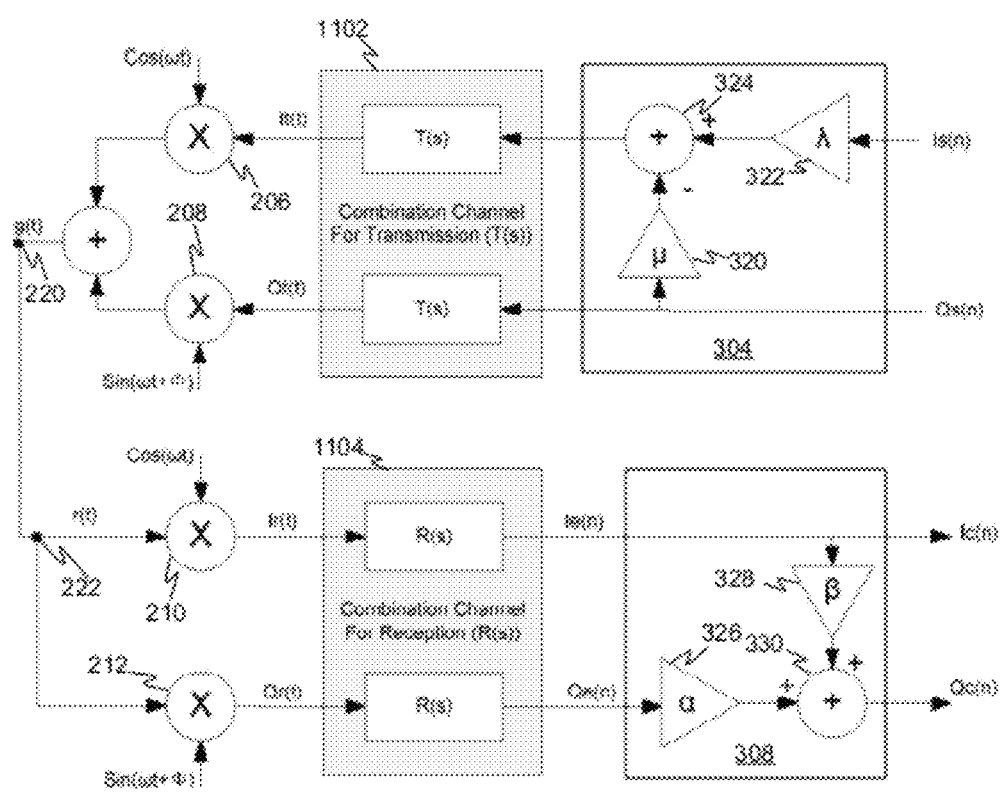
FIG. 11 is an exemplary signal flow diagram to calibrate receive path frequency independent IQ imbalance.

FIG. 11 is a corresponding signal flow diagram to calibrate receive path frequency independent IQ imbalance, wherein transfer functions 1102 and 1104 represent effects of transmit path 202 and receive path 204, respectively.

I and Q components of the corresponding receive path baseband signal may be represented as:

$$I_r(t)=I_c(t)\cos(\theta)+Q_c(t)\sin(\theta); \text{ and}$$

$$Q_r(t)=-I_c(t)\sin(\theta-\phi)+Q_c(t)\cos(\theta+\phi);$$

where:

$$I_c(t)=T(t)\otimes I_s(t)=T(t)\otimes Q_s(t), \text{ and } \theta \text{ is the signal propagation phase.}$$

The propagation phase or delay may be relatively insignificant during tuner calibration but may be arbitrary in $(0, 2\pi)$ when the calibration signal is from a remote transmitter.

$Q_r(t)$ may be further expanded to:

$$Q_r(t)=-I_c(t)(\sin(\theta)\cos(\phi)-\cos(\theta)\sin(\phi))+Q_c(t)(\cos(\theta)\cos(\phi)-\sin(\theta)\sin(\phi)),$$

or $$(Q_r(t)-I_c(t)\sin(\theta))/\cos(\phi)=-I_c(t)\sin(\theta)-Q_c(t)\cos(\theta).$$

When $\hat{Q}_r(t)=(Q_r(t)-I_c(t)\sin(\phi))/\cos(\phi)$, then:

$$I_r(t)+j*\hat{Q}_r(t)=(I_c(t)+j*Q_c(t))*(\cos(\theta)-j*\sin(\theta))$$

which indicates that $I_r(t)$ and $\hat{Q}_r(t)$ are balanced.

Parameters $\alpha$ and $\beta$ may be set to or defined as:

$$\alpha=1/\cos(\phi); \text{ and}$$

$$\beta=-\sin(\phi)/\cos(\phi).$$

$\hat{Q}_r(t)$ may then be expressed as $\hat{Q}_r(t)=\alpha Q_r(t)+\beta I_c(t)$, which may be generated in the digital domain as illustrated in FIG. 11, where $I_r(t)$ and $\hat{Q}_r(t)$ correspond to $I_c(n)$ and $Q_c(n)$, respectively.

Parameters) $\lambda=\cos(\phi)$ and $\mu=-\sin(\phi)$ may be determined as described above with respect to 108, and $\alpha$ and $\beta$ may be determined as:

$$\alpha=1/\lambda; \text{ and}$$

$$\beta=\mu/\lambda.$$

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A system, comprising:
   a transceiver including a transmit path and a receive path, each including corresponding zero intermediate frequency (ZIF) in-phase and quadrature phase (I and Q) tuners, each further including a digital equalizer to compensate frequency dependent IQ imbalance and a digital weighted summation module to compensate frequency independent IQ imbalance of the corresponding ZIF tuners;
a signal generator to provide a calibration signal to I and Q digital baseband nodes of the transmit path during a calibration mode;
a switching system to configure a plurality of loop-back paths and to control phases of the I and Q tuners during the calibration mode; and
a digital calibration system to receive I and Q digital baseband signals from the receive path in coordination with the switching system, to determine transmit and receive path compensation values, including equalization coefficients and summation weights, in a digital domain based on the received digital baseband signals, and to apply the transmit and receive path compensation values in the digital domain during an operation mode.

2. The system of claim 1, wherein:
the switching system is configured to operate the transmit and receive path I and Q tuners at a common phase, and to direct the calibration signal through the transmit path, from a transmit path summed tuner output node to a receive path tuner input node, and through the receive path; and
the digital calibration system is configured to determine receive path equalizer coefficients in response to corresponding receive path I and Q digital baseband signals.

3. The system of claim 2, wherein:
the digital calibration system is further configured to adjust the receive path equalizer coefficients to minimize an energy difference between the receive path I and Q digital baseband signals.

4. The system of claim 2, wherein:
the switching system is further configured to direct the calibration signal from outputs of transmit path low pass baseband filters to corresponding inputs of receive path low pass baseband filters; and
the digital calibration system is further configured to determine transmit path pre-equalizer coefficients in response to corresponding receive path I and Q digital baseband signals.

5. The system of claim 4, wherein:
the digital calibration system is further configured to adjust the transmit path pre-equalizer coefficients to minimize an energy difference between the receive path I and Q digital baseband signals.

6. The system of claim 4, wherein:
the switching system is further configured to operate the transmit and receive path I and Q tuners at corresponding I and Q phases, to direct the calibration signal through the transmit path, from the transmit path summed tuner output node to the receive path tuner input node, and through the receive path; and
the digital calibration system is further configured to determine transmit path summation weights in response to one of the corresponding receive path I and Q digital baseband signals.

7. The system of claim 6, wherein:
the transmit path weighted summation module includes a first weighted module coupled between the I and Q digital baseband transmit paths, and a second weighted module within one of the I and Q digital baseband transmit paths; and
the digital calibration system is further configured to adjust a weight of the first weighted module in response to the one of the receive path I and Q digital baseband signals, and to determine a weight of the second weighted module as a function of the weight of the first weighted module.

8. The system of claim 6, wherein:
the switching system is further configured to operate the transmit and receive path I and Q tuners at corresponding I and Q phases, to direct the calibration signal through the transmit path, from the transmit path summed tuner output node to the receive path tuner input node, and through the receive path; and
the digital calibration system is further configured to determine receive path summation coefficients in response to one of the corresponding receive path I and Q digital baseband signals.

9. The system of claim 8, wherein:
the receive path weighted summation module includes a first weighted module coupled between the I and Q digital baseband receive paths, and a second weighted module within one of the I and Q digital baseband receive paths; and
the digital calibration system is further configured to adjust a weight of the first weighted module in response to the one of the receive path I and Q digital baseband signals, and to determine a weight of the second weighted module as a function of the weight of the first weighted module.

10. The system of claim 1, wherein the switching system includes:
first and second switch modules to couple corresponding inputs of receive path low pass baseband filters to a selected one of a corresponding receive path tuner and an output of a corresponding transmit path low pass baseband filter;
a third switch module to operate the transmit path and receive path I and Q tuners in a selected one of corresponding I and Q modes and a common phase mode, wherein the common phase mode corresponds to an application of one of an I and a Q reference signal to all of the transmit path and receive path I and Q tuners; and
a fourth switch module to couple a receive path tuner input node to a selected one of a transmit path summed tuner output node and a receive path front end device.

11. A method, comprising:
applying a calibration signal to in-phase and quadrature phase (I and Q) digital baseband nodes of a transceiver transmit path during a calibration mode, wherein the transceiver includes transmit and receive path digital equalizers to compensate frequency dependent IQ imbalance and transmit and receive path digital summation modules to compensate frequency independent IQ imbalance associated with corresponding transmit and receive path I and Q zero intermediate frequency tuners;
selectively configuring a plurality of loop-back paths during the calibration mode;
selectively controlling phases of the transmit path and receive path tuners during the calibration mode; and
determining transmit and receive path compensation values, including equalization coefficients and summation weights in a digital domain based on receive path digital baseband signals generated in response to the calibration signal, the selectively configuring, and the selectively controlling; and
applying the transmit and receive path compensation values in the digital domain during an operation mode.

12. The method of claim 11, further including:
operating the transmit and receive path I and Q tuners at a common phase;

directing the calibration signal through the transmit path, from a transmit path summed tuner output node to a receive path tuner input node, and through I and Q receive paths; and determining receive path equalizer coefficients in response to corresponding receive path I and Q digital baseband signals.

13. The method of claim 12, wherein the determining the receive path equalizer coefficients includes:

adjusting the receive path equalizer coefficients to minimize a difference between the receive path I and Q digital baseband signals.

14. The method of claim 12, further including:

directing the calibration signal from outputs of transmit path low pass baseband filters to corresponding inputs of receive path low pass baseband filters; and determining transmit path pre-equalizer coefficients in response to corresponding receive path I and Q digital baseband signals.

15. The method of claim 14, wherein the determining the transmit path pre-equalizer coefficients includes:

adjusting the transmit path pre-equalizer coefficients to minimize a difference between the receive path I and Q digital baseband signals.

16. The method of claim 14, further including:

operating the transmit and receive path I and Q tuners at corresponding I and Q phases;

directing the calibration signal through the transmit path, from the transmit path summed tuner output node to the receive path tuner input node, and through the receive path; and determining transmit path summation weights in response to one of a corresponding receive path I and Q digital baseband signal.

17. The method of claim 16, wherein the determining the transmit path summation weights includes:

adjusting a first weight between I and Q digital baseband transmit paths in response to the one of the receive path I and Q digital baseband signals; and determining a second weight within one of the I and Q digital baseband transmit paths as a function of the first weight.

18. The method of claim 16, further including:

operating the transmit and receive path I and Q tuners at corresponding I and Q phases;

directing the calibration signal through the transmit path, from the transmit path summed tuner output node to the receive path tuner input node, and through the receive path; and determining receive path summation weights in response to one or more of the corresponding receive path I and Q digital baseband signals.

19. The method of claim 18, wherein the determining the receive path summation weights includes:

adjusting a first weight coupled between I and Q digital baseband receive paths in response to the one of the receive path I and Q digital baseband signals; and determining a second weight within one of the I and Q digital baseband receive paths as a function of the first weight.

* * * * *